United States Patent

[11] 3,536,153

| [72] | Inventor | Jerome Bombardier<br>Valcourt, Quebec, Canada |
|---|---|---|
| [21] | Appl. No. | 793,987 |
| [22] | Filed | Jan. 27, 1969 |
| [45] | Patented | Oct. 27, 1970 |
| [73] | Assignee | Bombardier Limited<br>Valcourt, Quebec, Canada |
| [32] | Priority | Nov. 29, 1968 |
| [33] | | Canada |
| [31] | | 36,541 |

[54] BRAKE SYSTEM
7 Claims, 3 Drawing Figs.

[52] U.S. Cl. .................................................. 180/5,
180/9.64; 188/2; 192/4; 305/9
[51] Int. Cl. .................................................. B62m 27/02
[50] Field of Search.......................................... 180/5, 72,
9.62, 9.2; 192/4, 17; 188/18, 78, 2(B); 305/9

[56] References Cited
UNITED STATES PATENTS
| 2,891,641 | 6/1959 | Rabe............................. | 192/4 |
| 3,414,091 | 12/1968 | Troy.............................. | 188/78 |

OTHER REFERENCES
'68 Evenrude Skeeter—Evenrude Motors, Milwaukee, Wis.

*Primary Examiner*—Richard J. Johnson
*Attorney*—Smart and Biggar

ABSTRACT: Brake system for snowmobiles including a drum-like member fixedly mounted for rotation with the driven wheel pulley shaft, a brake shoe on a pivoted lever arm mounted in such a manner as to cause a predetermined amount of self-braking action.

Patented Oct. 27, 1970

3,536,153

INVENTOR
JEROME BOMBARDIER
BY Smart & Biggar
ATTORNEYS

3,536,153

BRAKE SYSTEM

BACKGROUND OF THE INVENTION

1. Field of the Invention

The annual production of this type of vehicles which was totally unknown just a few years ago, is now well above one hundred thousand units. Furthermore, snowmobiles which were originally intended for use as transport means are now used nearly exclusively for sport and entertainment purposes. Hence an increasing number of snowmobiles will be used by inexperienced and/or relatively young operators. It is therefore increasingly important to produce a snowmobile which can be safely handled by children, especially when it is equipped with a powerful engine.

To this effect, the object of this invention is to afford better control of snowmobiles by providing a brake system which requires very little force on the part of the operator and yet which can "lock" the track even at relatively high speeds. The latter feature which may be undesirable in automobiles is quite important in snowmobiles because it was found that the throttle butterfly can stick in the open position especially during long runs such as when rallying. With a brake system which can lock the track, it has been found that one can quickly burn the drive belt hence disengaging the engine completely.

2. Description of the Prior Art

Hitherto snowmobile brakes generally consisted of a friction pad mounted on a pivotable lever arm and adapted to frictionally engage at least one face of a disc or of a wheel pulley associated with the transmission and clutch arrangement. While these methods should theoretically work satisfactorily on a lightweight snowmobile travelling at low speeds, the situation becomes quite different when the throttle jams in the open position and/or when a more powerful engine is fitted. With a big engine the brake is called upon to slow down a inherently heavier machine travelling at higher speeds, and also to reduce the speed of the engine, at least temporarily.

SUMMARY OF THE INVENTION

I have found that the problem of snowmobile brake systems can be satisfactorily resolved by the combination of a cylindrical friction surface and a suitably arranged brake shoe and lever arm therefor, and we have also discovered that such an arrangement can allow a considerable reduction of the bending moment applied to the brake disc (when only one friction pad is used) and to the chain case and can actually compensate for instead of contributing to the radial stresses acting upon the shaft bearings when the brake is applied immediately upon release of the throttle. Furthermore, it has been found that the brake system according to the invention affords practically instantaneous response which is an important feature when it is desired to use both the brake and the throttle controls simultaneously in the so-called "heel and toe" fashion as performed by race car drivers.

To this end the present invention provides a snowmobile brake system comprising a cylindrical surface fixedly mounted with respect to and rotatable with the shaft of the wheel pulley, a lever arm pivoted about an axis which is located between the end portions of said lever and within the periphery of said cylindrical surface and which is generally parallel and significantly spaced apart from said shaft. Control means is also provided which is operable upon one end portion of said lever arm to pivot said lever arm in a first direction about said axis. The arrangement also includes an arcuate brake shoe which is shaped to conform to said cylindrical surface, and has a friction lining facing said cylindrical surface. The brake shoe is mounted to the other end portion of said lever arm in such a manner that upon actuation of said control means to pivot said lever arm and cause engagement of said lining with said cylindrical surface, the pressure of engagement is substantially constant over the entire engaging surface of said lining. The lever arm is such that a first line joining said axis and the longitudinal axis of said shaft, and a second line joining said axis and the central area of the engaging surface of said lining, define an obtuse angle of 120° ± 15° when the lining is engaging said cylindrical surface.

In a preferred embodiment the brake shoe is pivotally connected to the lever arm and said second line is approximately twice as long as said first line. It was found particularly advantageous to provide the inner plate of the expansible wheel pulley with an integral flanged portion for forming said cylindrical surface; and spring means can be provided for ensuring positive return of the lever arm to the disengaged position upon release of the control means.

DESCRIPTION OF A PREFERRED EMBODIMENT

Figure 1:
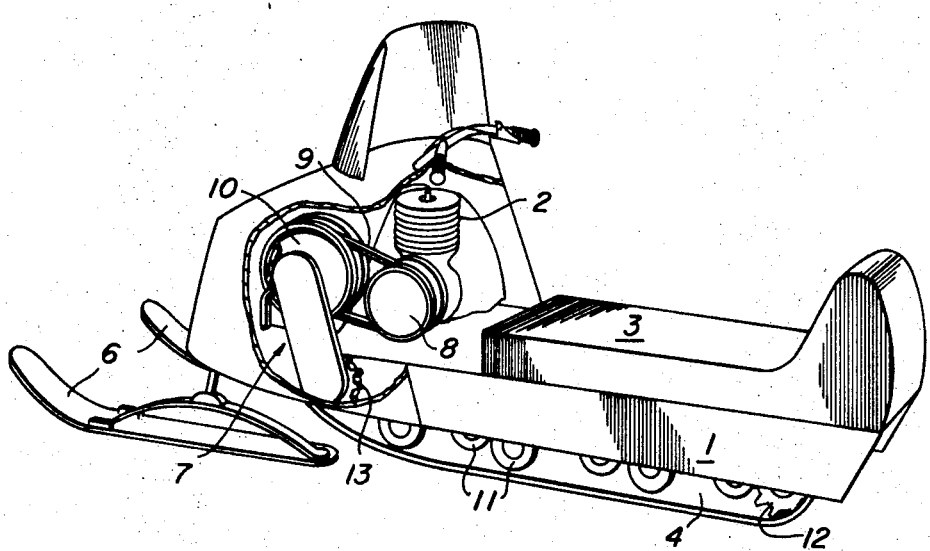
FIG. 1 is a partly open perspective view of a snowmobile showing a common disposition of the components of the driving train in a snowmobile.

With reference to FIG. 1, a snowmobile is illustrated which essentially comprises a frame 1 having at the front an engine 2 disposed forwardly of a seat 3; an endless track 4 supported by wheel buggies 11 and idle sprocket wheels 12 is driven by sprocket wheels 13. The steering means in the form of skis 6 are disposed immediately at the front of the endless track 4, and a suitable driving train 7, hereinafter to be described in detail, couples the output shaft of engine 2 to the driving sprockets 13.

The above is probably the most common layout of presently available snowmobiles. The driving train is also fundamentally the same on most brands since it was generally accepted that an automatically engaging clutch in combination with a gradually variable ratio transmission are the most suitable transmission means for snowmobiles. Essentially the clutch and torque converting mechanism comprises two expansible wheel pulleys, one connected to the motor output shaft, the other linked with the drive sprocket wheel, and a drive belt interconnecting the wheel pulleys. The driving wheel pulley is provided with a centrifugal force operated mechanism which controls the separation of the discs of the pulley thereby to cause the driving belt to ride in the space between the discs at a variable radial distance from the shaft of the pulley. A spring mounted on the shaft of the driven pulley urges the movable disc thereof towards the fixed disc and due to the geometry of the arrangement, the belt automatically moves deeper into the V-shaped formation presented by the discs of the driven pulley as the governor forces the belt towards the edges of the discs of the driving pulley. Hence, a variable ratio transmission is obtained.

Figure 2:
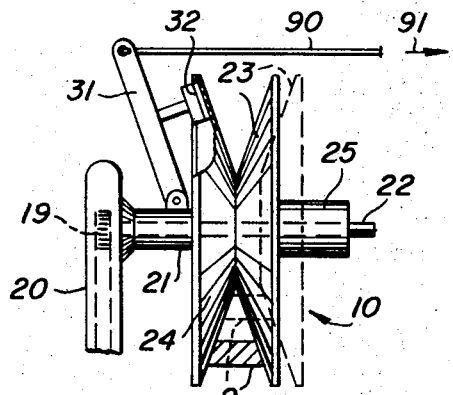
FIG. 2 is a front view of the commonly used chain case and variable transmission mechanism with a prior art brake arrangement.

Referring to FIG. 2, the arrangement illustrated comprises a chain case 20 adapted to be secured to the frame 1 (FIG. 1). Chain case 20 has an upper sleeve portion 21 in which are provided bearings (not shown) for shaft 22 that carries the driven wheel pulley 10 as well as a chain sprocket 19 connected by a chain 190 to driving sprockets 13 (FIG. 1). Wheel pulley 10 comprises two dish-shaped discs 23 and 24. Disc 24 is fixedly mounted on shaft 22 but disc 23 is provided with suitable means, diagrammatically illustrated at 25, which allows it to rotate with disc 24 and also to move along the axis of shaft 22 from a closed position as illustrated in solid line to an open position shown in chain line under the action of the belt 9 whose length is obviously constant. By suitably limiting the movement of disc 23 toward disc 24 the belt may be allowed to become loose below a predetermined minimum speed of rotation of the output shaft of engine 2 so that the endless track 4 becomes totally disengaged for idling purposes. As the speed of engine 2 gradually increases, the discs of driving pulley 8 close onto drive belt 9 which thereby starts rotating the driven pulley 10 and the drive sprocket 13. Then as the speed of the engine is further increased the discs of driving pulley 8 keep moving closer to one another thereby causing the radius of the surface of engagement of drive belt 9 with driving wheel pulley 8 to increase as that of driven wheel pulley 10 decreases. The end result is that the speed of rotation of endless track 4 increases at a considerably higher rate than engine 2 on account of the varying torque converting ratio of transmission 7.

Dealing now with the brake proper which, as will become apparent hereinafter, is closely associated with the above described transmission, FIG. 2 illustrates a known brake system which has some similarities with disc brakes. In fact, pressure pad 32 which is mounted on a pivoted lever 31, engages the outer side of the fixed disc 24 upon actuation of the brake control (not shown) which pulls the upper end of lever 31 by means of cable or linkage 90, toward disc 24. As mentioned hereinbefore, this simple arrangement can yield reasonable results when associated with light and low powered properly functioning snowmobiles. However, should the butterfly in the carburetor get iced up in the open position as can easily happen when snowmobiling on loose snow for a long period of time, this type of brake will not be strong enough to "hold" the motor and cause enough slippage of the drive belt 9 on pulleys 8 and 10 to disintegrate the belt by means of friction heat.

With an excessive leverage the braking power can be increased to a certain degree but then too much play is necessary at the short travel brake control such as shown at 49; and assuming that the brake control can be satisfactorily adjusted, excessive force is exerted upon the fixed disc 24 of pulley 10, which soon becomes damaged either through permanent deformation or cracking. Moreover through frequent use of the brake, the annular portion of the fixed disc 24 engaging friction pad 32, can become excessively hot with the result that drive belt 9 gradually disintegrates and consequently requires premature replacement. All these shortcomings are obviously enhanced when this brake system is associated with a snowmobile that has a powerful engine, say 20 horsepower or more.

Numerous attempts have been made to overcome the above noted disadvantages and invariably the end results were minor improvements at the cost of substantially more complicated designs. For instance, a second friction pad mounted on a separate lever has been tried, which was adapted to cooperate with the system of FIG. 2 although positioned between the two legs of the drive belt 9, but the complexity of the system and the frequent adjustments required rendered it impractical. It is also known to provide a proper disc brake consisting of a braking disc mounted on an extension of shaft 22 and a caliper fixedly retained onto the frame of the snowmobile. There again frequent adjustments are required and considerable force at the brake control 49 is necessary since there is not enough room in the engine compartment for a sufficiently large friction disc. It was also found that the pressure pads which are inherently small, had to be replaced quite frequently, and failure to do so at the proper degree of wear could result in the pads separating from the actuating mechanism and jamming the disc in place. In the occurrence the disc would normally get permanently scored and therefore due for replacement.

The brake system according to this invention is extremely simple as will now become apparent. Yet I have found that it can overcome practically all of the above noted disadvantages and ensure optimum braking capabilities with hardly any adjustment.

Essentially the brake system according to this invention comprises the fixed disc of pulley 10 presenting a cylindrical surface 50 which is fixedly mounted with respect to shaft 22 and is rotatable therewith. A lever arm 42 pivoted about an axis at 41 mounts a brake shoe 44. The pivotal axis 41 is located between the end portions of lever 42 within the periphery of cylindrical surface 50 and is significantly spaced from shaft 22. Control means 45,49 is coupled to the lever arm 42 in such a manner as to pivot lever arm 42 in a first direction about axis 41, and spring means 76 acts upon the free end portion of lever arm 42 to urge same in the opposite direction. The above-mentioned brake shoe 44 has a lining 48 and the assembly is arcuately shaped to conform to the cylindrical surface 50, and is mounted to the lever arm 42 in such a manner that upon actuation of control means 45,49 which pivots lever arm 42 in the first direction, the pressure of engagement of lining 48 with the cylindrical surface 50 is substantially constant over the entire engaging surface of lining 48.

Figure 3:
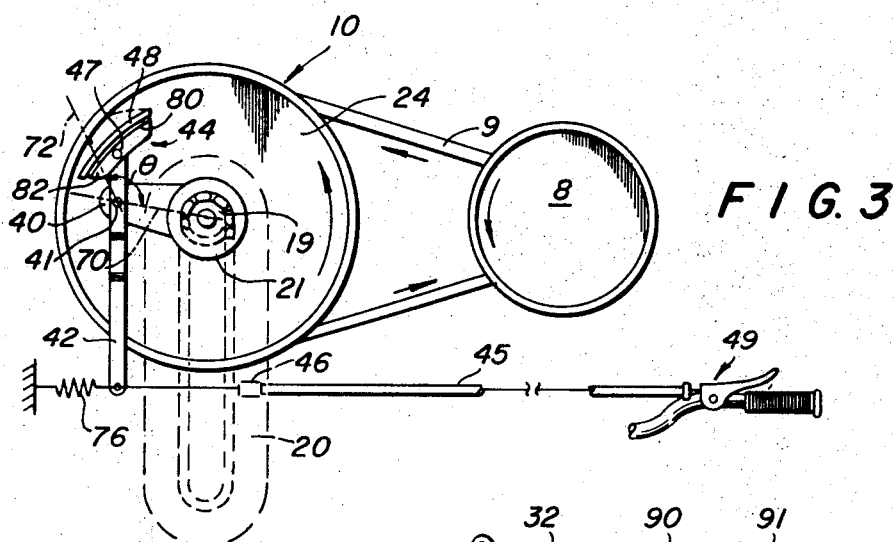
FIG. 3 is a side view of a similar chain case with a brake mechanism in accordance with this invention.

In the brake arrangement illustrated in FIG. 3 the cylindrical surface is formed by an integral flange 50 on the periphery of fixed disc 24. A separate drum like member secured to disc 24 could be substituted for flange 50 although difficulties may be encountered in permanently mounting the drum onto the disc 24. The integral flange has been found particularly advantageous since it reinforces the fixed disc and also adequately dissipates friction generated heat which therefore cannot damage drive belt 9. The lever arm 42 is pivoted at 41 to the lug 40 which is welded or otherwise secured to the chain case, preferably to its cylindrical sleeve 21. At the upper end portion of lever arm 42 the brake shoe 44 is arranged to engage the cylindrical surface of flange 50 upon counter-clockwise rotation of lever arm 42. The lower end portion of lever arm 42 is coupled with the brake control 49 by means of a boden cable 45 whose sheath is anchored to the chain case 20 as at 46. As shown at 47 the brake shoe 44 is pivotally connected to lever arm 42. By properly locating the pivot 47 on the brake shoe 44 the lining 48 can be adapted to apply uniform pressure on flange 50 hence, wear evenly. In practice it was determined that for best results pivot 47 should be slightly off centered toward the trailing edge of brake shoe 44.

In order to reduce the force required at the brake control the position of pivot 41 relative to the flange 50 and the axis of the shaft 22 is such that a certain amount of self-braking action is induced due to the tendancy of the brake shoe 44 to follow the movement of the rotating flange 50. The amount of induced self-braking action is, however, quite critical since too much will jam the brake shoe and too little may not sufficiently alleviate the force required at the brake control 49.

Specifically I have found that for a satisfactory degree of self-braking action a first line 70 joining the centre of shaft 22 and the pivot point 41 and a second line 72 joining the pivot point 41 and the centre of the surface of engagement of lining 48 with the cylindrical surface of flange 50, define an obtuse angle $\theta$ of $120° \pm 15°$, preferably $120° \pm 5°$. In a particular embodiment with which good results have been obtained, the angle $\theta$ was 120°, and the first line 70 was about twice as long as the second line 72, for a lining made of asbestos against a steel flange 50.

In order to ensure positive disengagement of the brake shoe, a return coil spring 76 is connected between the lower end of lever arm 42 and a fixed point on the frame of the snowmobile.

The arrangement thus far described has been found to be capable of stopping the endless track altogether with surprisingly little tension on the brake control 49. It has also been discovered that with this brake system, especially if care is taken to properly position lug 40 and anchorage point 46 for the boden cable 45, an important reduction in stresses acting upon the bearings of shaft 22 and upon chain case 20, or the equivalent structure that supports the shaft 22 into the frame 1, can be observed. This feature can best be described by comparing the arrangements of FIGS. 2 and 3.

Due to the action of drive belt 9 which transmits power from engine 2 onto wheel pulley 10, wheel pulley 10 is constantly urged toward the right with respect to FIG. 3, and since wheel pulley 10 is mounted on cantilever shaft 22 the resultant force on one hand tends to twist chain case 20 and, on the other, subjects the bearing which is closest to wheel 10 to substantial radial stresses.

If, in addition to these tensions, one simultaneously operates the brake control, such as can often happen when it is necessary to temporarily brake the engine, the situation worsens with the brake system of FIG. 2 because upon pulling cable 90 in the direction of arrow 91 pressure pad 32 tends to push the upper portion of disc 24 toward the right thereby further loading the bearings and the chain case 20. The action of the brake system shown in FIG. 3, particularly with lug 40 disposed opposite belt 9 and driving pulley 8 is quite different. In fact, when brake shoe 44 bears against the inside of flange 50 it counteracts the action of drive belt 9 and in so doing considerably relieves the tensions on the shaft's bearings and on chain case 20. Furthermore, the fixed disc 24 is not subjected to lateral efforts as in the embodiment illustrated in FIG. 2.

In an actual construction of the brake system according to this invention, the flange 50 had a radius of 5 inches, line 70 was made approximately 3.7 inches and line 72 approximately 2.1 inches. With a brake shoe 44 formed of an arcuate plate 80 of approximately 3 inches backed by a longitudinal rib 82 with a pivot aperture at 41 spaced about 1 inch from the engaging surface of the lining 48 and about .4 of an inch from the centre line of the brake shoe toward its trailing edge, the distance between pivot points 47 and 41 on lever arm 42 was made about 1.2 inches. Furthermore, the length of the lower end portion of lever arm 42 must be adjusted to suit the leverage at the brake control. For a finger operated brake control 49 it has been found sufficient to make this distance approximately 4 inches.

I claim:

1. A brake arrangement for a snowmobile which has a frame, an engine, an endless track and means for mounting the frame thereon, and a driving train which includes at least one wheel pulley mounted on a shaft, the shaft being journalled in support means secured to said frame; said brake arrangement comprising: a. means presenting a cylindrical surface, fixedly mounted with respect to and rotatable with said shaft, b. a lever arm pivoted about an axis which is located between the end portions of said lever and within the periphery of said cylindrical surface and which is generally parallel and significantly spaced apart from said shaft, c. control means operable to act upon one end portion of said lever arm thereby to pivot said lever arm in a first direction about said axis, and d. an arcuate brake shoe shaped to conform to said cylindrical surface, and having a friction lining facing said cylindrical surface, said brake shoe being mounted to the other of said end portions of said lever arm in such a manner that upon actuation of said control means to pivot said lever arm and thereby cause engagement of said lining with the cylindrical surface of said first mentioned means, the pressure of engagement is substantially constant over the entire engaging surface of said lining; said lever arm being so dimensioned and disposed that a first line joining said axis at right angle and the longitudinal axis of said shaft at right angle, and a second line coplanar with said first line, joining said first mentioned axis at right angle and the central area of the engaging surface of said lining, define an obtuse angle of 120° ± 15° with the lining in engagement with said cylindrical surface.

2. A brake arrangement for a snowmobile which has a frame, an engine, an endless track and means for mounting the frame thereon, and a driving train which includes as a variable transmission and clutch means a first expansible wheel pulley mounted on the output shaft of said engine, a second expansible wheel pulley mounted on and rotatable with a second shaft journalled in support means secured to said frame, and a drive belt coupling said wheel pulleys; said brake arrangement comprising an integral flange on the fixed disc of said second expansible wheel pulley, said flange presenting a cylindrical surface fixedly mounted with respect to and rotatable with said second shaft and projecting outwardly from the movable disc of said second expansible wheel pulley, a lever arm pivoted about an axis which is located between the end portions of said lever and within the periphery of said cylindrical surface and which is generally parallel and significantly spaced apart from said shaft, control means operable to act upon one end portion of said lever arm thereby to pivot said lever arm in a first direction about said axis, and an arcuate brake shoe shaped to conform to said cylindrical surface, and having a friction lining facing said cylindrical surface, said brake shoe being pivotally mounted to the other of said end portions of said lever arm in such a manner that upon actuation of said control means to pivot said lever arm and thereby cause engagement of said lining with the cylindrical surface of said first mentioned means, the pressure of engagement is substantially constant over the entire engaging surface of said lining; said lever arm being so dimensioned and disposed that a first line joining said axis at right angle and the longitudinal axis of said shaft at right angle, and a second line coplanar with said first line, joining said first mentioned axis at right angle and the central area of the engaging surface of said lining, define an obtuse angle of 120° ± 15° with the lining in engagement with said cylindrical surface, said second line being approximately twice as long as said first line.

3. A brake arrangement for a snowmobile which has a frame, an engine, an endless track and means for mounting the frame thereon, and a driving train which includes a variable transmission and clutch means a first expansible wheel pulley mounted on the output shaft of said engine, a second expansible wheel pulley mounted on and rotatable with a second shaft journalled in support means secured to said frame, said support means including a chain case which has a cylindrical sleeve portion with bearings therein which support said second shaft, and a drive belt coupling said wheel pulleys; said brake arrangement comprising an integral flange on the fixed disc of said second expansible wheel pulley, said flange presenting a cylindrical surface fixedly mounted with respect to and rotatable with said second shaft and projecting outwardly from the movable disc of said second expansible wheel pulley, a lever arm pivoted about an axis which is located between the end portions of said lever and within the periphery of said cylindrical surface and which is generally parallel and significantly spaced apart from said shaft, control means operable to act upon one end portion of said lever arm thereby to pivot said lever arm in a first direction about said axis, said control means comprising a hand-controlled lever operatively connected with a boden cable whose terminal is coupled to said one end portion of said lever and anchored onto said chain case, and an arcuate brake shoe shaped to conform to said cylindrical surface, and having a friction lining facing said cylindrical surface, said brake shoe being pivotally mounted to the other of said end portions of said lever arm in such a manner that upon actuation of said control means to pivot said lever arm and thereby cause engagement of said lining with the cylindrical surface of said first mentioned means, the pressure of engagement is substantially constant over the entire engaging surface of said lining; said lever arm being so dimensioned and disposed that a first line joining said axis at right angle and the longitudinal axis of said shaft at right angle, and a second line coplanar with said first line, joining said first mentioned axis at right angle and the central area of the engaging surface of said lining, define an obtuse angle of 120° ± 15° with the lining in engagement with said cylindrical surface, said second line being approximately twice as long as said first line.

4. The brake arrangement of claim 3 comprising a lug welded to said cylindrical sleeve and projecting generally radially outwardly therefrom toward said flange in a direction opposite said first wheel pulley, said lug having an aperture at its outer end where the intermediate portion of said lever arm is pivotally connected to said lug.

5. The brake arrangement of claim 4, wherein the radius of the cylindrical surface of said drumlike flange is 5 inches whereas the distance between the centre of the lug aperture and the longitudinal axis of said shaft is about 3.7 inches and the distance between said centre and the central area of the engaging surface of said lining when in engagement with said flange, is about 2.1 inches.

6. The brake arrangement of claim 5 additionally comprising a return spring acting upon said one end portion of said lever arm and adapted to urge said lever arm in a direction opposite said first direction.

7. The brake arrangement of claim 1, wherein said angle is 120° ± 5°.

UNITED STATES PATENT OFFICE
CERTIFICATE OF CORRECTION

Patent No. 3,536,153       Dated October 27, 1970

Inventor(s) Jerome Bombardier

It is certified that error appears in the above-identified patent and that said Letters Patent are hereby corrected as shown below:

Column 2, line 5, change "second" to --first-- line 6, change "first" to --second--

Column 6, line 18 and 59 change "second" to --first-- line 19 and 60 change "first" to --second--

Signed and sealed this 2nd day of May 1972.

(SEAL)
Attest:

EDWARD M. FLETCHER, JR.          ROBERT GOTTSCHALK
Attesting Officer                Commissioner of Patents